Inventors
Richard C. Palmer
Vincent D. Poirier
Ernest F. Blase

Inventors
Richard C. Palmer
Vincent D. Poirier
Ernest F. Blase

Cadwallader, Kelly & Dacey
By Attorneys

United States Patent Office 3,282,855
Patented Nov. 1, 1966

3,282,855
METHOD OF MAKING THERMOLUMINESCENT MANGANESE - ACTIVATED CALCIUM FLUORIDE
Richard C. Palmer, Goleta, Vincent D. Poirier, Santa Barbara, and Ernest F. Blase, Goleta, Calif., assignors to Edgerton, Germeshausen and Grier, Inc., Bedford, Mass., a corporation of Massachusetts
Filed Aug. 2, 1965, Ser. No. 476,635
2 Claims. (Cl. 252—301.4)

This application is a continuation-in-part of application Serial No. 242,105, filed December 4, 1962, now abandoned.

The present invention relates to thermoluminescent dosimetry and in particular to a method of making thermoluminescent manganese-activated calcium fluoride for use in thermoluminescent dosimeters.

Luminescence may be defined as a phenomenon wherein matter generates non-thermal radiation which is characteristic of the particular material. Usually the phenomenon is not considered as confined to the emission of visible light. Luminescence occurs at relatively low temperatures and is thus distinguished from incandescence which occurs when substances are heated strongly. Luminescence is a generic term which includes various terms such as bioluminescence, chemiluminescence, cathodoluminescence, electroluminescence, galvanoluminescence, ionoluminescence, photoluminescence, sonoluminescence, and thermoluminescence. Note that the prefixes indicate the means for exciting the luminescent material. The light may be emitted either as fluoroescence or phosphorescence. Fluoroescence denotes the emission which occurs during excitation of the luminescent material; while phosphorescence may be defined as the release of stored energy from the material, as light, after the removal of the exciting source. A considerable amount of research has been performed over the last three decades to determine if luminescent materials can be used in dosimetry systems. The processes of electroluminescence, photoluminescence, and thermoluminescence appear to be quite promising and considerable success has been realized in devising systems which make use of them. Known luminescent materials are numbered by the thousands; but the number of thermoluminescent materials suitable for radiation dosimetry is very small. Processes for making luminescent materials are numbered by the thousands; but the number of processes for making thermoluminescent materials suitable for radiation dosimetry is very small. In fact, all known processes heretofore reported in the literature and disclosed in patents produce thermoluminescent phosphors that are too contaminated to be acceptable for use in commercial dosimetry systems. Characteristics of contaminated thermoluminescent phosphors will be discussed hereinafter.

Thermoluminescence may be broadly defined as the emission of light when a solid is heated to a temperature substantially below that of incandescence, and in general the properties noted are a result of crystal imperfections. All crystals have defects, which may be due to a vacancy at one of the lattice points, an impurity atom at a lattice point, or an interstitial atom or ion in the lattice structure. Regardless of type, the presence of imperfections will introduce new energy levels into the normal lattice energy levels. It is possible that some of the energy levels will constitute metastable states and be able to trap electrons for extended periods of time. The "depth" of these traps can be related to a thermal stability for the trapped electrons.

Though ionizing radiation will cause crystal defects, the major consequence of the energy loss in a crystal will be the excitation of the electronic structure in the crystal lattice. The electrons, freed in this way, are able to travel in the conduction band of the crystal until they either return to their normal energy level or are trapped in a metastable level. At some later time it is possible to release the trapped electrons into the conduction band by the application of thermal energy. The electrons may then lose their energy in radiative or nonradiative transitions to the ground state, with the first process having the greater probability of occurrence.

By appropriate calibration, the amount of light emitted by a thermoluminescent phosphor can be related to the intensity of the radiation to which it was exposed. In theory a thermoluminescent phosphor should respond to any ionizing radiation, whether particulate or electromagnetic. Certain optically allowed transitions, which degrade the thermoluminescent signal, will also be observed in many of the phosphors and care must be taken to avoid exposure to light when these phosphors are used as radiation monitors.

The normal manner of evaluating a thermoluminescent phosphor is by means of a glow curve. This curve is obtained by increasing the temperature of an exposed thermoluminescent phosphor at a known linear rate and recording the intensity of light output as a function of temperature. FIGURE 5 shows three glow curves 60, 61, and 71. Note that glow curve 71 contains a number of maximum at different temperatures. The most desirable thermoluminescent manganese-activated calcium fluoride should have a single maximum at about 280° C. because this is easier to read and interpret. There is experimental evidence showing that maxima at lower temperatures are related to a reducing atmosphere during firing. These low temperature maxima have a greater rate of storage loss with time than the maximum at 280° C.

The principal thermoluminescent phosphors have been LiF, $CaSO_4$:Mn, $CaSO_4$:Sm, and $CaF_2$:Mn. For a variety of reasons—insufficient sensitivity, short lifetime of the trapped electrons in the metastable states, or inability of the researchers to reproduce their materials—only two of these phosphors are considered practical for use in radiation dosimetry. These are $CaF_2$:Mn and LiF. However, each of these phosphors has disadvantages as well as advantages when they are compared to an "idealized" dosimetry system. A summary of their current status in dosimetry is given by F. H. Attix in "Present Status of Dosimetry by Radiophotoluminescence and Thermoluminescence Methods," published in 1964 in Report No. 6145 of the U.S. Naval Research Laboratory.

For $CaF_2$:Mn, the two major disadvantages are that (1) its energy response is not equivalent to that of tissue and (2) it is not commercially available. The first objection is overcome by an appropriate energy compensation shield to correct for the overresponse of $CaF_2$:Mn below 500 kev. In regard to the second difficulty, several procedures for activating $CaF_2$ with Mn are described in the literature. One method of preparation has been the introduction of the Mn activator in the form of ammonium manganous fluoride ($NH_4MnF_3$) described by A. L. Smith in the Journal of the Electrochemical Society 101, 189 (1954); by D. E. Hegberg and H. A. Treibs in an article entitled "Proposed Band Structure of $CaF_2$:Mn" published in General Electric Document No. HW-70230, Handford Atomic Products Operation, Richland, Washington, 1961; and by personnel of the U.S. Naval Research Laboratory in various articles published in the literature. With regard to the latter, one of the early processes is described by R. J. Ginther in an article entitled "Sensitized Luminescence of $CaF_2$:(Ce+Mn)," published in the May 1954 issue of the Journal of the Electrochemical Society at pages 248 and 249. The process may be represented generally by the following equation:

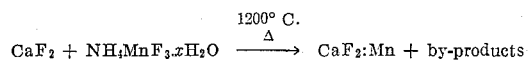

$$CaF_2 + NH_4MnF_3 \cdot xH_2O \xrightarrow[\Delta]{1200°\ C.} CaF_2:Mn + \text{by-products}$$

The $NH_4MnF_3 \cdot xH_2O$ is precipitated from manganous chloride solution with ammonium fluoride. $x$ indicates that an unknown number of water molecules have attached themselves to each molecule of $NH_4MnF_3$ as evidenced by the pink color. The $CaF_2$ and $NH_4MnF_3 \cdot xH_2O$ powders are dry mixed and then fired in a platinum crucible at 1000°–1200° C. in an inert atmosphere of helium or nitrogen. Difficulties arise during firing with the decomposition of $NH_4MnF_3$ in the presence of $H_2O$, even in an inert atmosphere. Some of the products are $NH_3$, HF and $MnF_2$. $NH_3$ reacts with oxygen in the presence of platinum to give NO and $NO_2$. These gases are highly active and thus the inert atmosphere is not inert. The manganese is converted from the activating +2 state of oxidation to some other state and no longer activates the $CaF_2$. On evaluation of such phosphors, it is found that the glow curves contain a number of maxima of light output as a function of temperature. The maxima at temperatures lower than 280° C. have a much greater rate of storage loss than the 280° C. maximum. This means that some of the radiation absorbed by the phosphor will be lost before the glow curve is recorded and read at which time the result will be in error. Moreover, such phosphors cannot be produced with the same composition each time because of the variable atmosphere produced during firing.

Later, Ginther and Kirk modified this process to produce a phosphor that could be used to read a radiation dose of 1 mr. They surrounded the platinum crucible with graphite and fired it at 1200° C. for 16 hours in an air atmosphere. Again, the decomposition of $NH_4MnF_3$ produced the same difficulties, but with the further difficulty that the graphite produced CO and $CO_2$ at the elevated temperature. The CO reduced the metal salts to the base metal or corresponding carbide thereby contaminating the phosphor. This phosphor had maxima at 125° C. and 280° C. Hence, its storage loss, although not tested, was questionable. At 125° C. the maximum ranged from 5 to 15 percent and the maximum at 280° C. ranged from 85 to 90 percent of that obtained at 280° C. with phosphors made according to the present invention.

Prior to the firing steps of the foregoing processes developed by Ginther and by Ginther and Kirk many intermediate steps are involved in the preparation of "fresh" $CaF_2$ and $NH_4MnF_3$ from $CaCO_3$, $MnCl_2 \cdot 4H_2O$, and $MnCO_3$. Altogether, the procedure takes more than 3 days to produce a 25-gram sample of thermoluminescent material. The many intermediate steps and the activation procedure increase the chance of error, with the result that reproducible samples are difficult to obtain.

The best available grades of $CaF_2$ and $MnF_2$ (reagent grades are not available) have been dry mixed and fired in an effort to produce thermoluminescent manganese-activated calcium fluoride. In all cases it has been found that the phosphor must have been contaminated because two or more maxima on the glow curve were produced, and the 280° C. maximum was 1 to 5 percent of the 280° C. maximum of the phosphors of the present invention. It is believed that the best grade of $MnF_2$ is contaminated with other compounds in such amounts as to contaminate the resulting phosphor. In particular, it is known that manganese in the +2 state of oxidation actually activates the $CaF_2$. Manganese in the +3 and +4 states will render the $CaF_2$ ineffective as a thermoluminescent material. Hence it appears that the best grade of $MnF_2$ contains a substantial amount of manganese in the +4 state of oxidation.

A number of processes are known for making manganese-activated compositions of calcium fluoride and aluminum fluoride and compositions of calcium fluoride and beryllium fluoride including coprecipitation processes for making them. In each of these processes the manganese activator is introduced as manganous fluoride, manganous chloride, manganous sulfate or as any other suitable salt of manganese. These processes produce phosphors that are suitably luminescent for use in cathode-ray tubes and luminescent lamps. However, these phosphors are not suitable for thermoluminescent dosimetry applications because the maxima they produce are too small to be used practically. This indicates that the activators used resulted in the presence of manganese in the +4 state of oxidation.

It is known that $CaF_2$ may be precipitated from $CaCO_3$ with concentrated hydrofluoric acid. Attempts to precipitate $MnF_2$ from $MnCO_3$ and hydrofluoric acid have been unsuccessful because after the liquid phase is decanted, the remaining precipitate changes color and becomes a mixture of +2, +3 and +4 states of oxidation of manganese. This is the primary reason why Ginther and Kirk utilized the $NH_4MnF_3$ technique—they tried to maximize the amount of +2 state manganese fired with the $CaF_2$.

On the other hand, we have invented a process for the preparation of thermoluminescent, manganese-activated calcium fluoride ($CaF_2$:Mn) that involves the entrainment of the +2 state manganese in the $CaF_2$ lattice at an early stage and avoids converting it to another state during firing.

It is, accordingly, an object of the present invention to avoid the disadvantages of the $NH_4MnF_3$ technique by reducing the number of intermediate steps and simplifying the activation procedure in making thermoluminescent $CaF_2$:Mn, while retaining the desirable characteristics, particularly the 280° C. peak, of the $NH_4MnF_3$ prepared phosphor.

A further object is to provide a process for incorporating a manganese activator into $CaF_2$ without changing it from the necessary +2 state to another state of oxidation.

Other objects and various further features of novelty and invention will be pointed out or will occur to those skilled in the art from a reading of the following description in conjunction with the drawing in which.

Figure 3:
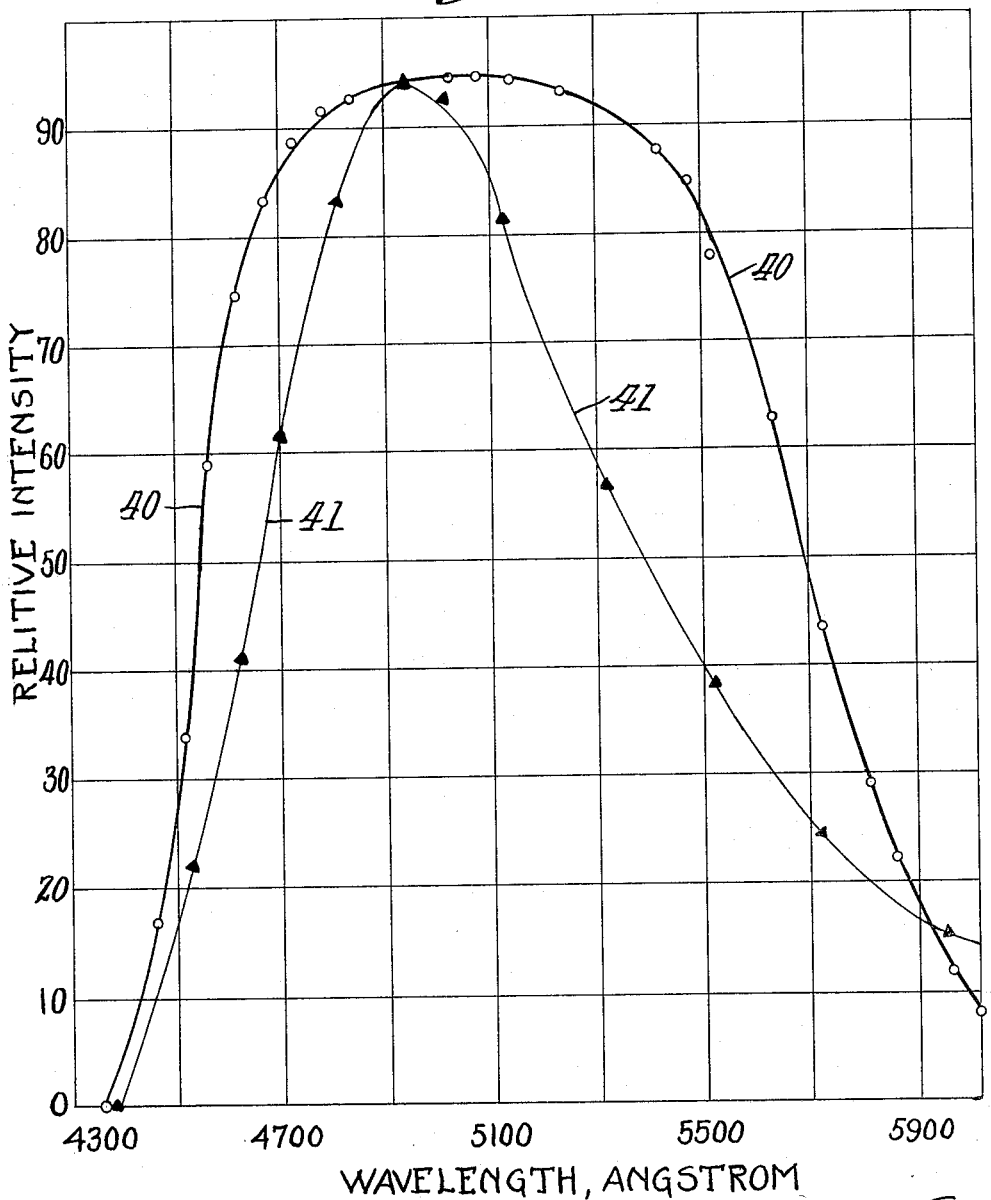
Figure 4:
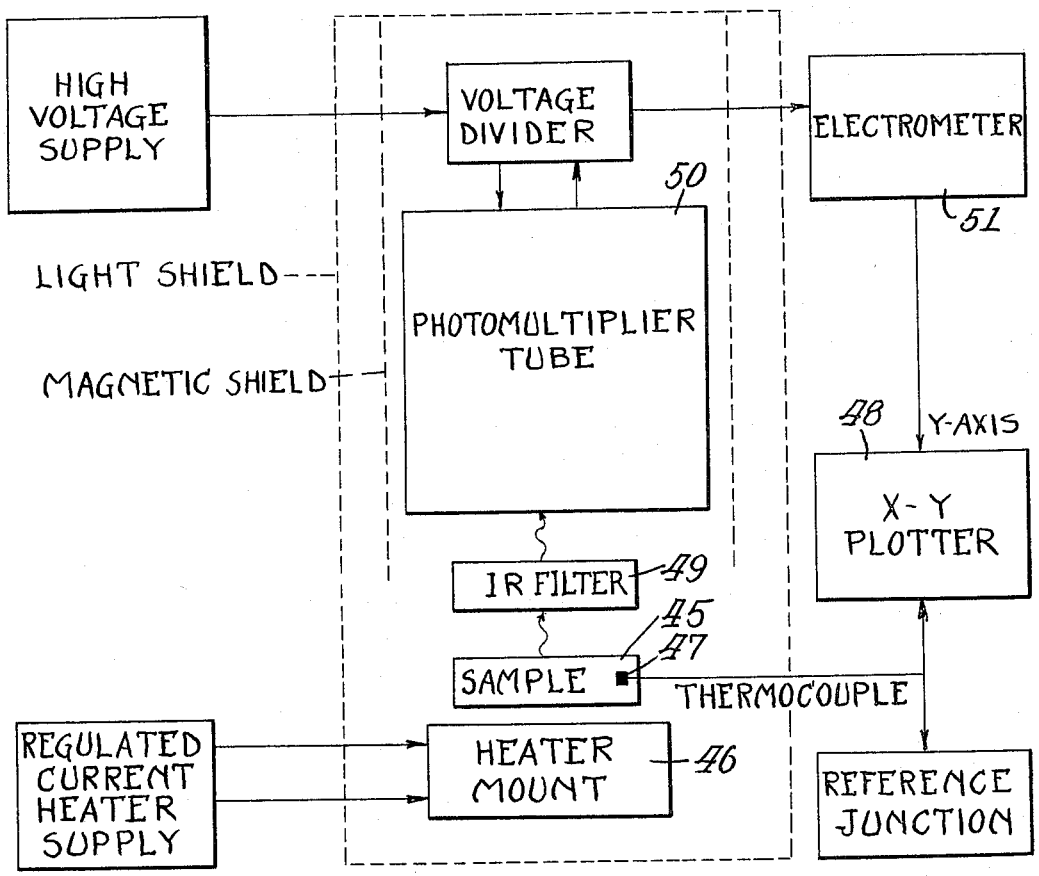
Figure 5:
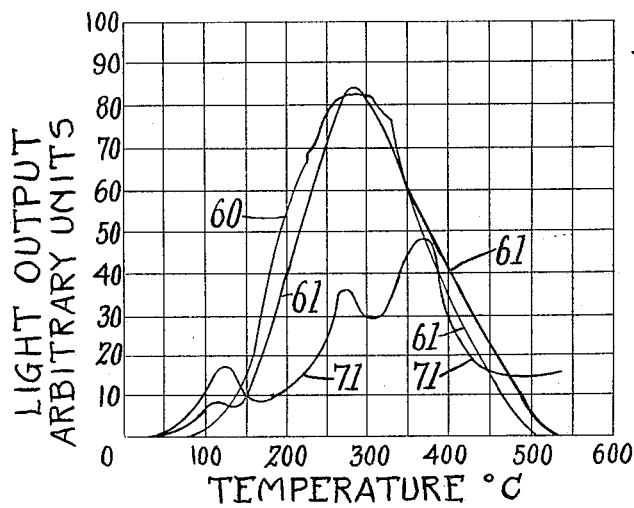
Figure 6:
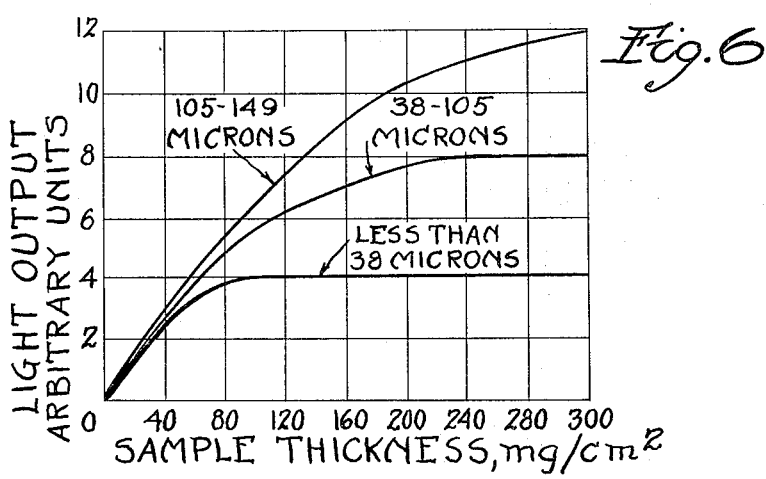
Figure 7:
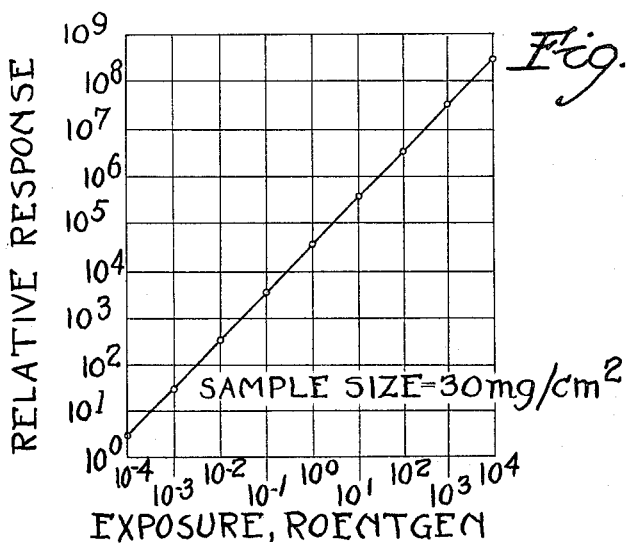

FIGURE 3 presents graphically the thermoluminescent spectrums of manganese-activated calcium fluoride prepared according to the present invention and by the $NH_4MnF_3$ technique;

FIGURE 4 illustrates laboratory apparatus for recording a glow curve;

FIGURE 5 illustrates the glow curves of manganese-activated calcium fluoride prepared according to the present invention and by the $NH_4MnF_3$ technique;

FIGURE 6 presents graphically the variations in light output caused by changes in amount and particle size of manganese-activated calcium fluoride prepared according to the present invention; and FIGURE 7 similarly illustrates the variation in light output as a function of radiation exposure.

The following analytical reagent-grade materials may be used: calcium carbonate ($CaCO_3$), manganous carbonate ($MnCO_3$), hydrofluoric acid (48 percent by weight HF), and hydrochloric acid (38 percent by weight HCl). All distilled water used should have at least 1 megohm of resistivity. Water-pumped helium, that has been dried, may be used to furnish an inert atmosphere during activation.

As an example indicating proportions, thirty-two grams of $CaCO_3$ and 1.32 grams of $MnCO_3$ are dry mixed for 5 minutes in a blender and then transferred to a 500-ml. Teflon beaker. Twenty-five ml. of distilled water is added to the beaker, and the mixture is stirred until a wet slurry is obtained. With vigorous stirring, 50 ml. of hydrofluoric acid is quickly added. After the evolution of gas ceases, the resulting mixture is diluted with distilled water to 400 ml. and allowed to stand for 30 minutes or until the precipitate settles out. The liquid phase is decanted and the pink precipitate is rinsed three times with 400 ml. of distilled water, allowing the precipitate to settle out each time and decanting the water. The precipitate is dried at 95° C. for 2 hours, cooled to room temperature, and may be stored in a desiccator until needed for firing.

At this point in the process the precipitate fluoresces under X-irradiation but is only very weakly thermoluminescent. The +2 state manganese is entrained in the $CaF_2$ lattice. The precipitate may be represented by the formula $CaF_2:MnF_2.xH_2O$. Now, if this precipitate is fired according to the Ginther and Kirk process the resulting material is completely ineffective as a thermoluminescent material.

PROCEDURE FOR ACTIVATING THE $CaF_2:MnF_2$ TO PRODUCE THERMOLUMINESCENT $CaF_2:Mn$

Figure 1:
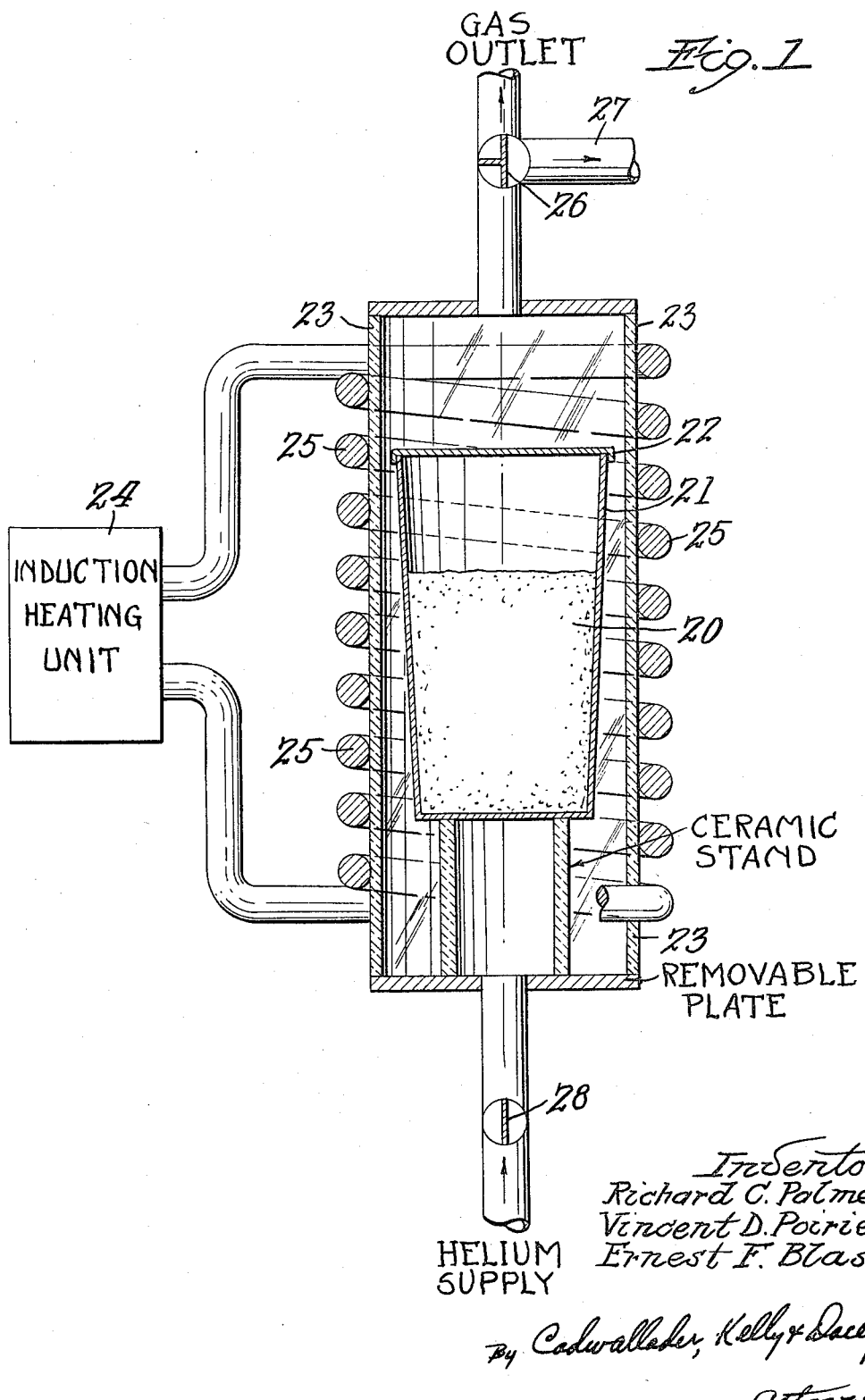
FIGURE 1 illustrates schematically laboratory apparatus for accomplishing one step of the process.

In the laboratory we used a platinum crucible and lid. These are cleaned in accordance with standard procedures by boiling in concentrated hydrochloric acid for 30 minutes, rinsing three times with distilled water, and firing at 1200° C. for 30 minutes. The procedure may be repeated if necessary. Referring to FIGURE 1, twenty-five grams of coprecipitated $CaF_2:MnF_2.xH_2O$ shown as 20 are placed in platinum crucible 21 and crucible lid 22 is placed loosely into position. Crucible 21 and lid 22 are placed in controlled-atmosphere bell jar 23 which may be made of quartz. Bell jar 23 is evacuated to a pressure of 10 microns. By suitable heating means such as induction heating unit 24 with heating coils 25, the temperature of crucible 21 is raised to 400° C. and maintained at this temperature for 30 minutes to complete the drying of coprecipitated powder 20 during which time most of the $H_2O$ is removed. Stopcock 26 to vacuum line 27 is closed, stopcock 28 to the helium supply is then opened, and bell jar 23 is filled with dry helium. Stopcock 26 to the gas outlet is opened as illustrated and the helium flow is adjusted to 25 to 50 ml./min.

The temperature of crucible 21 as measured optically is raised to 1200° C. ($\pm 15°$ C. over the entire crucible surface) and maintained for 30 minutes. Crucible 21 is then allowed to cool to room temperature in the helium atmosphere. It is then removed from bell jar 23 and opened. A hard, white cake of material, not shown, is obtained. The material may be ground and sieved to desired particle size and then be used. However, we have found that sensitivity is improved by the following steps. The material is ground and sieved through a 105-micron sieve. The sieved material is placed in a 100-ml. glass beaker to which is added 25 ml. of hydrochloric acid. The mixture is heated to near boiling and maintained at this temperature for 30 minutes. The hot hydrochloric acid is allowed to cool to room temperature and decanted, and the white material is washed with distilled water until free of acid. In these steps any oxides on the surfaces of the crystallites are removed. The activated $CaF_2:Mn$ is then dried in an oven at 95° C. for 2 hours. After drying, the $CaF_2:Mn$ is sieved to obtain a separation of the various-sized particles. For coating on a metallic substrate the $CaF_2:Mn$ is ground and sieved to obtain approximately 44-micron material. The activated $CaF_2:Mn$ is stored in a desiccator prior to evaluation or use.

EVALUATION OF $CaF_2:Mn$ PHOSPHOR

As the manganese is substituted interstitially for the calcium, the lattice constants provide an excellent means of comparing different phosphors. The following are the constants that were obtained from X-ray diffraction analysis:

| | A. |
|---|---|
| $CaF_2$ | 5.4626 |
| $CaF_2:Mn$ by coprecipitation technique | 5.4556 |
| $CaF_2Mn$ by $NH_4MnF_3$ technique | 5.4556 |

Figure 2:
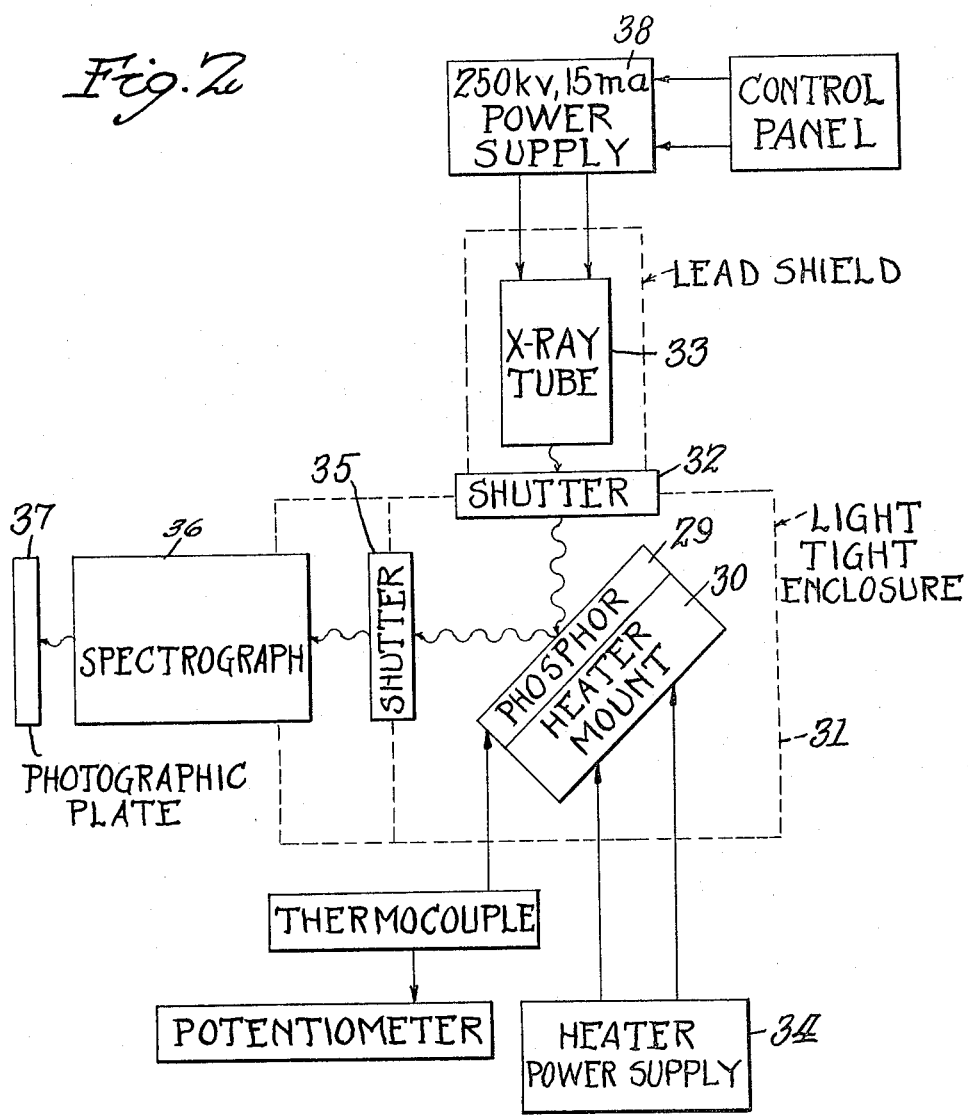
FIGURE 2 illustrates schematically apparatus for measuring the thermoluminescent spectrum of samples of manganese-activated calcium fluoride.

Measurements of the thermoluminescent spectrum of the phosphor were made with the apparatus shown in FIGURE 2. The activated phosphor 29 was placed on heater mount 30 in light-tight enclosure 31 and then irradiated for 30 minutes through shutter 32 at 100 r./min., with X-rays generated by X-ray tube 33 operated at 150 kv. and 15 ma. by power supply 38. After the exposure, shutter 32 was closed. Phosphor 29 was then heated by means of heater power supply 34 and heater mount 30 to 375° C. over a 7 minute period, with shutter 35 to spectrograph 36 being opened as the power was applied to heater mount 30. A spectrographic photographic plate 37 was used to record the emission trace. To ensure maximum development, plate 37 was first placed in distilled water at 20° C. to warm and soften the emulsion. Development was then accomplished in an X-ray film developer at 20° C. for 6 minutes with constant agitation. This process was followed by normal fixing, washing and drying. The resulting emission trace was read on a recording densitometer. The thermoluminescent spectrum is illustrated as curve 40 in FIGURE 3. Also shown by curve 41 in FIGURE 3 is the spectrum obtained from a phosphor produced by the $NH_4MnF_3$ technique.

Typical laboratory apparatus for obtaining a glow curve is shown in FIGURE 4. In the present case, a sample 45 of activated phosphor having a thickness of 200 mg./cm.$^2$ was exposed to a level of 90 roentgens in a 900-curie $Co^{60}$ central cavity irradiator, not shown, and was then placed on heater mount 46 as shown schematically in FIGURE 4. The temperature of sample 45 was increased linearly at 1° C. per second as measured by copper-constantan thermocouple 47 connected to the X-axis of X-Y plotter 48. The light output, after passing through infrared (IR) filter 49 to remove black-body radiation, is sensed by a 6199 photomultiplier tube 50. The 6199 photomultiplier tube 50 was chosen since its S-11 response characteristics closely match the emission spectrum of the $CaF_2:Mn$ phosphor. The resulting signal is amplified by electrometer 51 and fed to the Y-axis of X-Y plotter 48.

The glow curve 60 obtained for sample 45 is shown in FIGURE 5. Only one maximum at 280° C. is detected for this particular phosphor. Glow curve 61 was obtained from a sample prepared by the $NH_4MnF_3$ technique. The intensity of the peak at 280° C. is within $\pm 5$ percent of that obtained from sample 45; however, a second maximum at 125° C. of much lower intensity is evident in glow curve 61.

Glow curves 60 and 61 shown in FIGURE 5 should not be interpreted as a measure of the sensitivity or total light output of the phosphors per unit of exposure, but rather as a comparison between two materials under identical conditions of light-collection efficiency, system efficiency and gain, particle size, and amount of phosphor. The effect of the last two variables on light output is shown in FIGURE 6 with respect to samples prepared according to the present invention.

FIGURE 7 shows the variation of light output as a function of exposure, as determined by measuring the area under the glow curve for various exposure levels. The sample size used was 30 mg./cm.$^2$, and each data point represents a fresh sample of $CaF_2:Mn$. The dynamic range was covered by dropping the high voltage of power supply 38 in FIGURE 2 by selected increments at 1 r. and $10^3$ r. Within the experimental error of the determination of $\pm 3$ percent ($\pm 50$ percent for $10^{-4}$ r.), no deviation from 1:1 linearity is observed from $10^{-4}$ to $10^4$ r. Preliminary data taken at exposure doses in excess of $10^4$ r. indicate a linearity dependence on both particle size and sample thickness, and a definite attenuation of the light by the phosphor itself. At $10^5$ r., color center formation within the phosphor is clearly discernible.

Results for the phosphor prepared with the $NH_4MnF_3$ technique were identical to those above.

An important facet of thermoluminescent phosphors is the phosphor's ability to retain information (trapped electrons) for long periods of time at room temperature. It is this factor together with their dynamic range that makes phosphors attractive as radiation detectors. A calculation of the storage stability of $CaF_2$:Mn by theory of phosphorescence indicates a loss of information for the 280° C. trap of less than 3 percent per year. To test this experimentally, several 100 mg. samples of $CaF_2$:Mn phosphor prepared according to the present invention were enclosed in glass envelopes, dosed to 90 r., stored in light-tight containers at room temperature, and then read out at various time intervals. After corrections were made for background accumulation, no detectable loss of information was encountered over a 2-month storage period. Similar tests with the $NH_4MnF_3$ phosphor, however, were not made.

EFFECTS OF VARYING PRODUCTION PARAMETERS ON CHARACTERISTICS OF $CaF_2$:Mn PHOSPHOR

Experiments performed to determine the effects of variations in firing time and temperature indicate that neither is a critical factor for temperatures of 900° C. to 1250° C., and for time periods of 15 minutes to 4 hours. When particles of the same size from samples fired for different times and temperatures are compared, the sensitivities are identical within experimental error of ±3 percent. The temperature and time of firing serve only to determine the average crystallite size in the sample, in that the longer the firing and the higher the temperature, the greater the crystallite size. In the example described above, firing for 30 minutes at 1200° C. produced a large yield of approximately 44-micron material. This size material is easy to bond to a heater substrate using a binder and has adequate sensitivity to detect a $10^{-4}$ exposure. Larger particles tend to lump on the substrate and later when dried, to flake off. Smaller particles absorb too much emitted light.

In the $NH_4MnF_3$ technique, the HF formed from the decomposition of the $NH_4MnF_3$ is depended on to furnish a slightly reducing atmosphere to protect the manganese from oxidation. In the modified Ginther procedure, CO and $CO_2$ from the graphite surrounding the crucible help to protect the manganese from oxidation after the HF is dissipated. In the process of the present invention, the manganese is protected from both oxidation by air and reduction by CO and HF.

The controlled atmosphere bell jar 23 of FIGURE 1 was set up to check the following atmospheres: (1) inert, (2) vacuum, (3) oxidizing, and (4) reducing.

(1) *Inert.*—Both dry argon and dry helium were used as inert atmospheres. In both cases the results were identical and glow curve 60 in FIGURE 5 was obtained.

(2) *Vacuum.*—Coprecipitated samples were placed in bell jar 23 as before and a vacuum of 10 microns was achieved, after which the temperature of the sample was raised to 400° C. for 30 minutes. The temperature was then raised slowly to 1200° C. in such a manner that the pressure did not exceed 100 microns. Temperature was held at 1200° C. for 30 minutes. Subsequent analysis revealed only one peak at 280° C. but with only 75 percent of the light output of samples prepared in an inert atmosphere.

(3) *Oxidizing.*—Coprecipitated samples were placed in bell jar 23, evacuated to 10 microns, and heated to 400° C. for 30 minutes as in previous runs. Bell jar 23 was then flushed with oxygen, and the temperature of crucible 21 was raised to 1200° C. and maintained at that temperature for 30 minutes. Subsequnt analysis revealed a dark colored phosphor having only one maximum in light output at 280° C. but with only 5 percent of the sensitivity of samples fired in an inert atmosphere.

(4) *Reducing.*—The reducing atmosphere used in the bell jar was carbon monoxide (CO). As mentioned previously, CO generally will reduce metal salts to the corresponding metal or convert them to metal carbides at temperatures between 300° and 1500° C., depending on the particular compound. Coprecipitated samples were placed in bell jar 23, evacuated to 10 microns, and dried at 400° C. for 30 minutes as before. They were then flushed with dry CO as the temperature was raised to 1200° C. Again the time of firing at 1200° C. was 30 minutes. A glow curve analysis revealed that this material had two distinct maxima in light output as a function of temperature—one at 125° C. which comprised from 5 to 15 percent of the total light output, and one at 280° C. which accounted for 85 to 95 percent of the light output. The total light output under the curve, however, was identical to that of the samples fired in the inert atmosphere.

Experiments to determine the effect of $MnF_2$ content on the phosphor characteristics have been carried out for 1, 2, 3, 4, 5, and 10 mole percent $MnF_2$. A 100-A. shift in and a broadening of the emission spectrum are caused by an increase in the $MnF_2$ content over the above ranges. As measured by the 6199 phototube employed in the apparatus of FIGURE 4, the sensitivity of the phosphor varies with $MnF_2$ content, with a maximum light output achieved at 3.45-mole percent $MnF_2$, and covers a sensitivity range of 10 percent. When a correction is applied for phototube response, however, the phosphors all have the identical sensitivity within experimental error.

CONCLUSIONS

The coprecipitation technique for producing thermoluminescent $CaF_2$:Mn phosphor offers three distinct advantages over the $NH_4MnF_3$ procedure: (1) greatly simplified procedure (2) reproducibility, and (3) elimination of the low-temperature component of the glow curve. The ease of production and reproducibility is well demonstrated by the production of 200 samples of $CaF_2$:Mn, in which the sensitivity varied by no more than ±3 percent. Although sample-size has been limited to 25 grams because of the induction heating unit's small capacity, no difficulty is foreseen that precludes the firing of larger samples more in line with production requirements.

The presence of the low-temperature component (125° C. peak) of the glow curve has been related to a reducing atmosphere during activation of the phosphor. The elimination of this component has been accomplished by the use of an inert atmosphere of helium during the activation process. Because the low-temperature component has a greater rate of storage loss than the higher temperature component, its elimination serves to decrease the over-all loss of information by the phosphor in a given period of time.

It will be seen that we have described a new and novel process for the production of thermoluminescent, manganese-activated calcium fluoride. While we have described our invention in detail for the preferred methods shown, it will be understood that modifications may be made within the scope of the invention, as defined in the following claims.

We claim:

1. The method of making thermoluminescent, manganese-activated calcium fluoride that comprises:

mixing an aqueous slurry of calcium carbonate and 1 to 10 mole percent of manganous carbonate, said carbonates having at least reagent grade purity, with a concentrated solution of hydrofluoric acid to produce a precipitate consisting of calcium fluoride having manganese ions intermixed in the crystal lattice thereof;

washing the precipitate sufficiently to remove all hydrofluoric acid and other byproducts of the reaction;

drying the precipitate to produce a powder of calcium fluoride having manganese ions intermixed in the crystal lattice thereof;

heating said powder in a flushing, dry inert gas atmosphere at a temperature of 900° C. to 1250° C. for a time period of 15 minutes to 4 hours to convert said powder to thermoluminescent, manganese-activated calcium fluoride; and cooling said manganese-activated calcium fluoride in said flushing, dry inert gas atmosphere.

2. The method of making thermoluminescent, manganese-activated calcium fluoride as in claim 1 further comprising:

grinding said cooled manganese-activated calcium fluoride into small particles;

heating said small particles in a hydrochloric acid solution for about 30 minutes;

washing said particles with distilled water; and drying said particles.

References Cited by the Examiner

UNITED STATES PATENTS

| 2,746,933 | 5/1956 | Smith | 252—301.4 |
| 2,757,144 | 7/1956 | Lind | 252—301.4 |

OTHER REFERENCES

Ginther: Sensitized Luminescence of $CaF_2:(Ce+Mn)$, J. Electrochemical Society, volume 101, No. 5, May 1954, pages 248–257.

TOBIAS E. LEVOW, *Primary Examiner.*

R. D. EDMONDS, *Assistant Examiner.*